H. Springer.
Grass Seed Sower.
Nº 88,525. Patented Mar. 30, 1869.
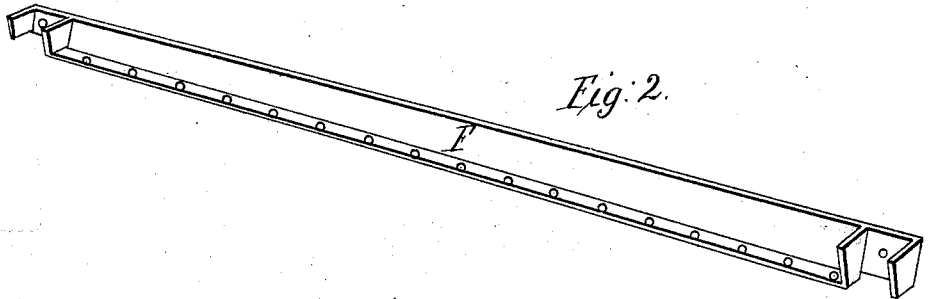
Fig. 2.
Fig. 1.
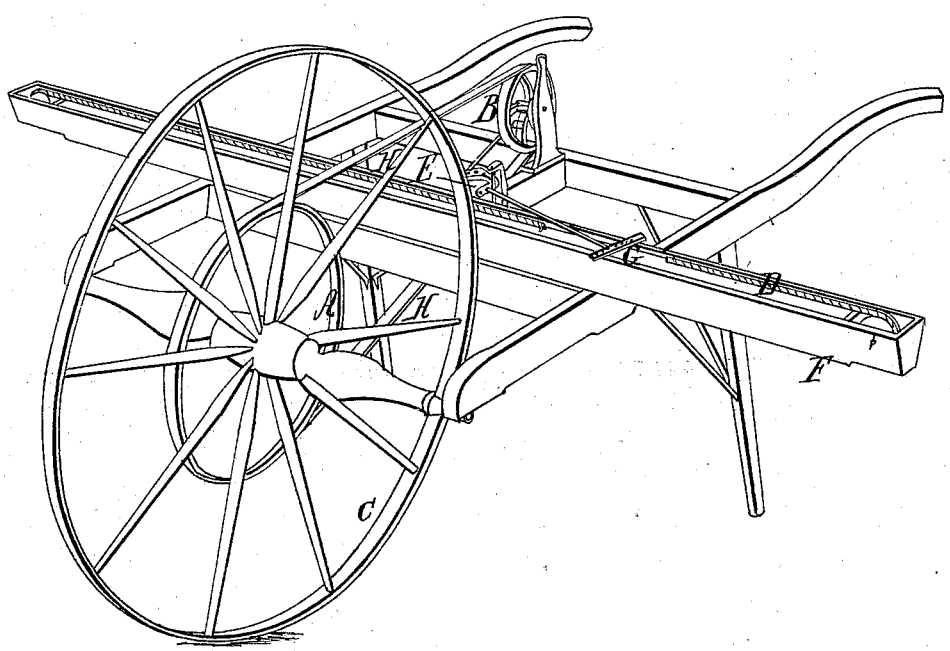
Witnesses:
Isaac Starr
W. L. Eaton.
Inventor,
Henry Springer

United States Patent Office.

HENRY SPRINGER, OF BRADY, MICHIGAN.

Letters Patent No. 88,525, dated March 30, 1869.

---

IMPROVEMENT IN MACHINE FOR SOWING GRASS-SEED.

---

The Schedule referred to in these Letters Patent and making part of the same.

---

*To all whom it may concern:*

Be it known that I, HENRY SPRINGER, of Brady, in the county of Kalamazoo, in the State of Michigan, have invented a new and useful Improvement on the Machine for Sowing Grass-Seed; and I do hereby declare that the following is a full, clear, and exact description thereof, reference being had to the annexed drawings, making part of this specification, in which—

Figure 1 is a perspective view, and

Figure 2, a longitudinal and sectional view of the seed-box.

The nature of my improvement consists in arranging the seed-box F inside of the belt H, and between the pulleys A and B, its rope D being operated by the lever G, in connection with the bell-crank E, which is worked by a rod from the crank-pulley B; also, in constructing the bell-crank E and lever I with a number of holes, so that the rods can be changed, to increase or diminish the amount of motion imparted to the rope D, which sifts the seed through holes in the bottom of the seed-box F.

The object of my improvement is to sow seed evenly while going over the ground; also, to have the weight of the seed-box and its contents fall on the ground-wheel C; also, to regulate the amount of seed sown, by placing the rods in the different holes of the bell-crank E and lever G, which regulate the motion of the rope within the seed-box F; also, to support the seed-box F, so that it can be filled conveniently, thereby obviating the necessity of placing it on the ground in muddy weather; also, to enable the operator to work the machine with ease, the seed-box being conveniently situated inside of the belt H, back of the ground-wheel C, and in front of the crank-pulley B and bell-crank E.

To enable others skilled in the art to make and use my improved machine, I will proceed to describe its construction and operation.

I construct my seed-box with holes, three-sixteenths of an inch in diameter, at intervals of three inches, in the bottom, through which the seed is sifted, fast or slow, according to the motion of the rope D, which I make to pass over pulleys at either end of the seed-box F, the ends of which I connect with the lever I, which imparts a reciprocating motion to it. I hold the rope D in place over the holes by a grooved strip. I hold the seed-box F on the frame by steady-pins and a hook, in such a manner that it may be readily removed, if desired. I fasten pulley A to the spokes of the ground-wheel C, which is connected by belt H to crank-pulley B, which is connected by a rod to bell-crank E, which operates the lever G, thereby imparting a reciprocating motion to the rope D.

What I claim as new, and desire to secure by Letters Patent, is—

1. The position of the seed-box F, it being situated between the belt H, connecting pulley A with pulley B, in the manner and for the purpose specified.

2. The combination of the bell-crank E and lever I, in connection with the pulleys A and B, substantially in the manner and for the purpose set forth and described.

HENRY SPRINGER.

Witnesses:
ISAAC STARR,
W. L. EATON.